(12) United States Patent
Cant et al.

(10) Patent No.: US 7,656,648 B2
(45) Date of Patent: Feb. 2, 2010

(54) BUS-BAR AND CONNECTOR

(75) Inventors: Malcolm Cant, Wokingham (GB); Jan Van Tilburg, Oss (NL); Peter Dirk Jaeger, Dussen (NL)

(73) Assignees: Tyco Electronics UK Ltd., Wiltshire (GB); Tyco Electronics Nederland B.V., Hertogenbosch (NL)

( * ) Notice: Subject to any disclaimer, the term of this patent is extended or adjusted under 35 U.S.C. 154(b) by 15 days.

(21) Appl. No.: 12/065,064

(22) PCT Filed: Aug. 17, 2006

(86) PCT No.: PCT/GB2006/003082

§ 371 (c)(1),
(2), (4) Date: Feb. 28, 2008

(87) PCT Pub. No.: WO2007/026115

PCT Pub. Date: Mar. 8, 2007

(65) Prior Publication Data

US 2008/0218946 A1   Sep. 11, 2008

(30) Foreign Application Priority Data

Aug. 30, 2005   (GB) ................... 0517627.6

(51) Int. Cl.
*F21V 21/005*   (2006.01)

(52) U.S. Cl. .............. 361/637; 361/611; 361/648; 439/110; 439/114; 362/396

(58) Field of Classification Search .......... 361/611, 361/624, 637, 638, 639, 648, 675; 362/147, 362/391, 404, 249, 648, 649, 652, 659; 439/110–121, 439/679, 858, 861, 830, 856; 174/99 B, 174/96, 97, 681
See application file for complete search history.

(56) References Cited

U.S. PATENT DOCUMENTS

| 2,725,542 | A | * | 11/1955 | Born et al. ............... 439/114 |
| 3,099,504 | A | * | 7/1963 | Rowe ..................... 439/114 |
| 3,181,102 | A | * | 4/1965 | Fehr, Jr. .................. 439/116 |
| 3,401,230 | A | * | 9/1968 | Giger, Jr. ................... 174/98 |
| 3,439,309 | A | * | 4/1969 | Giger, Jr. et al. .......... 439/114 |
| 3,922,053 | A | * | 11/1975 | Hafer ..................... 439/114 |
| 4,398,066 | A | * | 8/1983 | Sinberg .................. 379/412 |
| 5,259,774 | A | * | 11/1993 | Gabrius .................. 439/110 |
| 5,525,068 | A | * | 6/1996 | Graham et al. ........... 439/114 |
| 5,584,576 | A | * | 12/1996 | Wei Hong ............... 362/396 |
| 5,803,755 | A | * | 9/1998 | Kuchar et al. ............ 439/110 |
| 6,890,219 | B1 | * | 5/2005 | Mayer et al. ............. 439/679 |
| 7,172,332 | B2 | * | 2/2007 | Mobarak et al. .......... 362/649 |

FOREIGN PATENT DOCUMENTS

| DE | 9110533.1 | 11/1991 |
| DE | 29821042 U1 | 6/1999 |
| DE | 10121584 A1 | 6/2002 |
| EP | 0381923 A1 | 8/1990 |
| EP | 1049227 A2 | 11/2000 |
| GB | 1169318 | 11/1969 |

* cited by examiner

*Primary Examiner*—Michael V Datskovskiy
(74) *Attorney, Agent, or Firm*—Barley Snyder LLC (57) ABSTRACT

A bus-bar having a prismatic housing, an elongate conductor extending along a length of the housing, and a resilient retainer which extends along a length of the housing and retains the conductor in the housing is disclosed.

16 Claims, 7 Drawing Sheets

BUS-BAR AND CONNECTOR

CROSS-REFERENCE TO RELATED APPLICATION DATA

This application claims the benefit of the earlier filed International Patent Application No. PCT/GB2006/003082 having a filing date of Aug. 17, 2006 which claims priority to the earlier filed British Patent Application No. GB 0517627.6 having a filing date of Aug. 30, 2005.

FIELD OF THE INVENTION

The present invention relates to an electrical bus-bar.

BACKGROUND

Conventional bus-bars involve multi-step and therefore costly fabrication processes and/or are difficult to recycle because it is difficult to separate the different components thereof. When recycling such devices, it is normally desirable to separate metal conductor portions thereof from plastics housing members. A prior art bus-bar is described in patent application JP 4162381 which includes three longitudinal insulating members, two of which have continuous conductors embedded therein. The three longitudinal members are held and clamped together by clamping assemblies spaced along the length of the bus-bar, each of which includes a pinch bolt extending through a spacer member and two arms which are urged towards each other by the pinch-bolt so as to clamp the three longitudinal members toward each other. Accordingly, disassembly of the bus-bar for the purpose of recycling involves the dismantling of the clamping assemblies and extraction of the conductors from the longitudinal members in which they are embedded.

SUMMARY

The present invention relates to, in one embodiment among others, a bus-bar having a prismatic housing, an elongate conductor extending along a length of the housing, and a resilient retainer which extends along a length of the housing and retains the conductor in the housing.

BRIEF DESCRIPTION OF THE DRAWINGS

Embodiments of the invention will now be described by way of example only and with reference to the accompanying drawings in which.

DETAILED DESCRIPTION OF THE EMBODIMENT(S)

Figure 1:
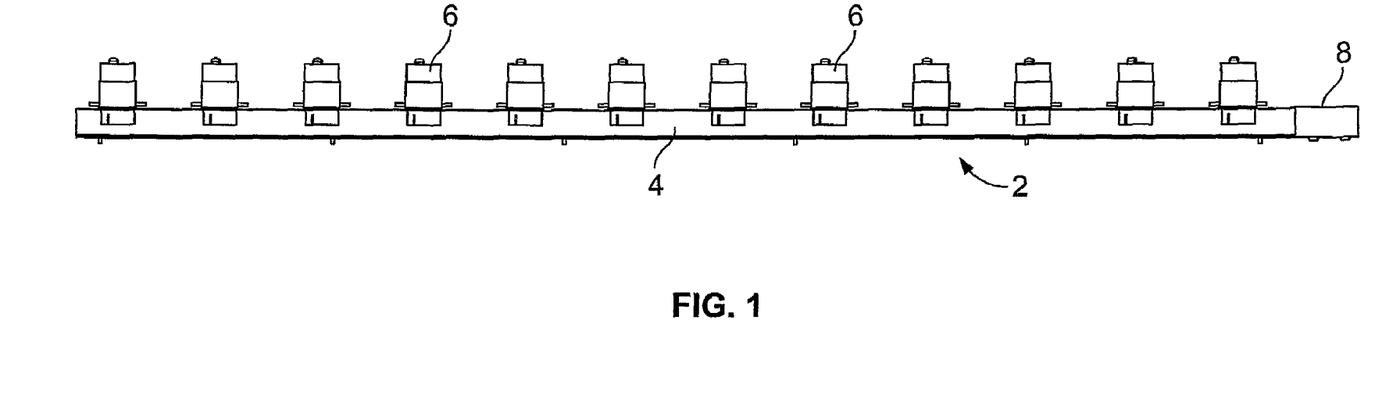
FIG. 1 is an orthogonal side view of a bus-bar according to an embodiment of the present invention.
Figure 2:
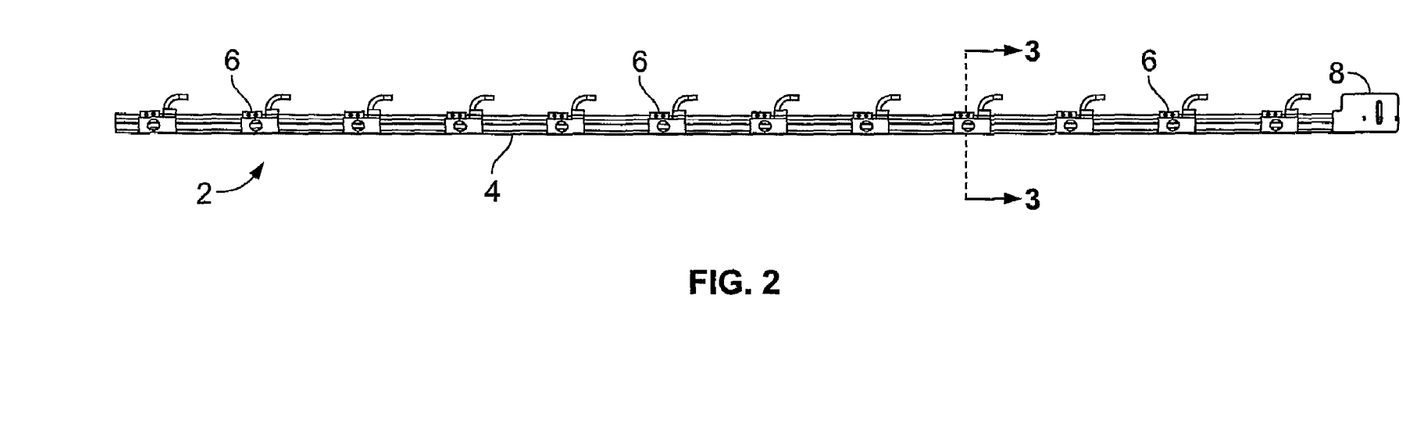
FIG. 2 is an orthogonal top view of the bus-bar of FIG. 1.

A bus-bar 2 according to the invention is shown in FIG. 1 including an insulating housing 4 with connectors 6 spaced therealong and a terminator 8 at one end thereof for connecting conductors of the bus-bar 2 to an electrical supply.

Figure 3:
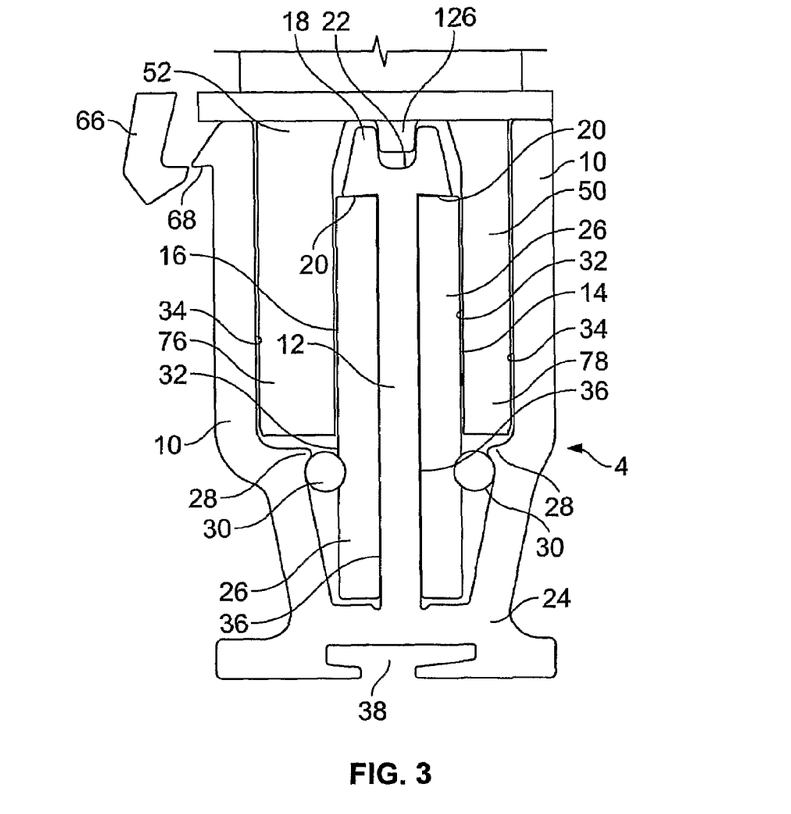
FIG. 3 is a cross-sectional view of the bus-bar of FIG. 1 taken at cutting line 3-3 of FIG. 2 and showing a connector engaged therewith.
Figure 4:
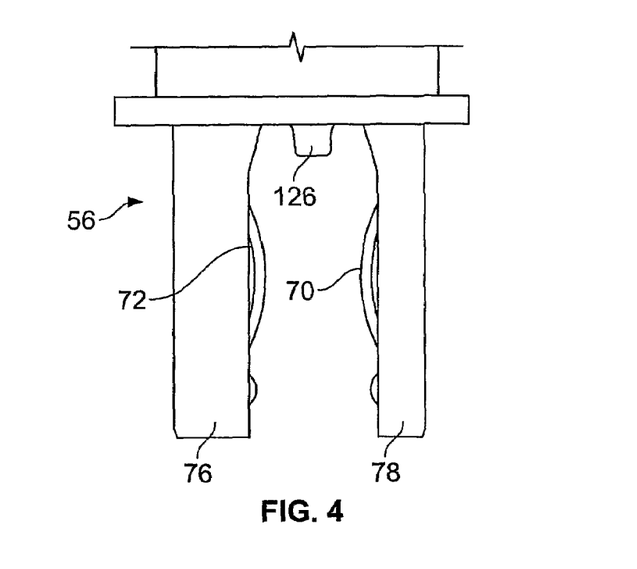
FIG. 4 is a cross-section view of the connector of FIG. 3 while not connected to the bus-bar of FIG. 1.

Referring now to FIG. 3, the housing 4 is made from extruded plastic, is generally U-shaped, and has two side members 10 and an inner partition 12 that divides an interior of the housing 4 into a narrow cavity 14 and a wide cavity 16. The wide cavity 16 is wider than the narrow cavity 14. A distal end of the inner partition 12 has an enlarged head 18, the underside of which defines a recess 20 on each side of the inner partition 12. The upper side of the enlarged head 18 is provided with a stabilization groove 22. On each side of the inner partition 12 and positioned between one of the recesses 20 and a base 24 of the housing 4, an elongate prismatic conductor 26 is provided which may be made of nickel plated copper alloy, non plated copper alloy, tin over nickel, or gold over nickel. An inner wall 34 is provided at a lower portion of the adjacent side member 10 with an inwardly projecting shoulder 28 which extends the length of the housing 4. An elongate elastomeric cord-like retainer 30 is located below the shoulder 28 and is compressed between an outer surface 32 of the conductor 26 and an inner wall 34 of the side member 10. Each conductor 26 and its associated retainer 30 are accordingly held between confronting walls of the respective narrow cavity 14 or wide cavity 16 constituted by the inner wall 34 of a side member 10 and an outer wall 36 of the inner partition 12. With such an arrangement, the danger of a conducting object being accidentally inserted into the bus-bar 2 and inadvertently causing a short between the conductors 26 can be avoided.

So as to ensure that the conductor 26 is held particularly securely in the housing 4, the conductor 26 is urged by the retainer 30 into the recess 20 in the housing 4.

The retainer 30 can be easily manipulated and squashed as it is inserted into or extracted from the housing 4. Furthermore due to the resilient nature of the retainer 30, the conductor 26 will be retained firmly in place even when the housing 4 distorts slightly as a result of mounting and/or temperature variations. The retainer 30 may be prismatic and may conveniently be cord-like in form so that it will support the conductor 26 in a continuous manner along the length of the bus-bar 2. Such cord-like elastomeric material is furthermore available as a stock item and accordingly will not have to be specially manufactured. The retainer 30 may extend along substantially an entire length of the housing 4.

The base 24 of the housing 4 has an undercut groove 38 along which fasteners (see FIG. 8) are slideable for mounting the housing 4 on an appropriate surface.

The bus-bar 2 is constructed by cutting the housing 4, the retainers 30, and conductors 26 to the required lengths, locating one conductor 26 on each side of the inner partition 12 below the enlarged head 18, and then forcing one of the cut lengths of retainers 30 into each cavity 14, 16 between the conductor 26 and the adjacent inner wall 34 until it has been squeezed past the shoulder 28 on the inner wall 34 of the side member 10. Dismantling the bus-bar 2 is a straightforward reversal of this process and involves hooking the retainers 30 out of the housing 4 with a screwdriver or sharp object.

Figure 8:
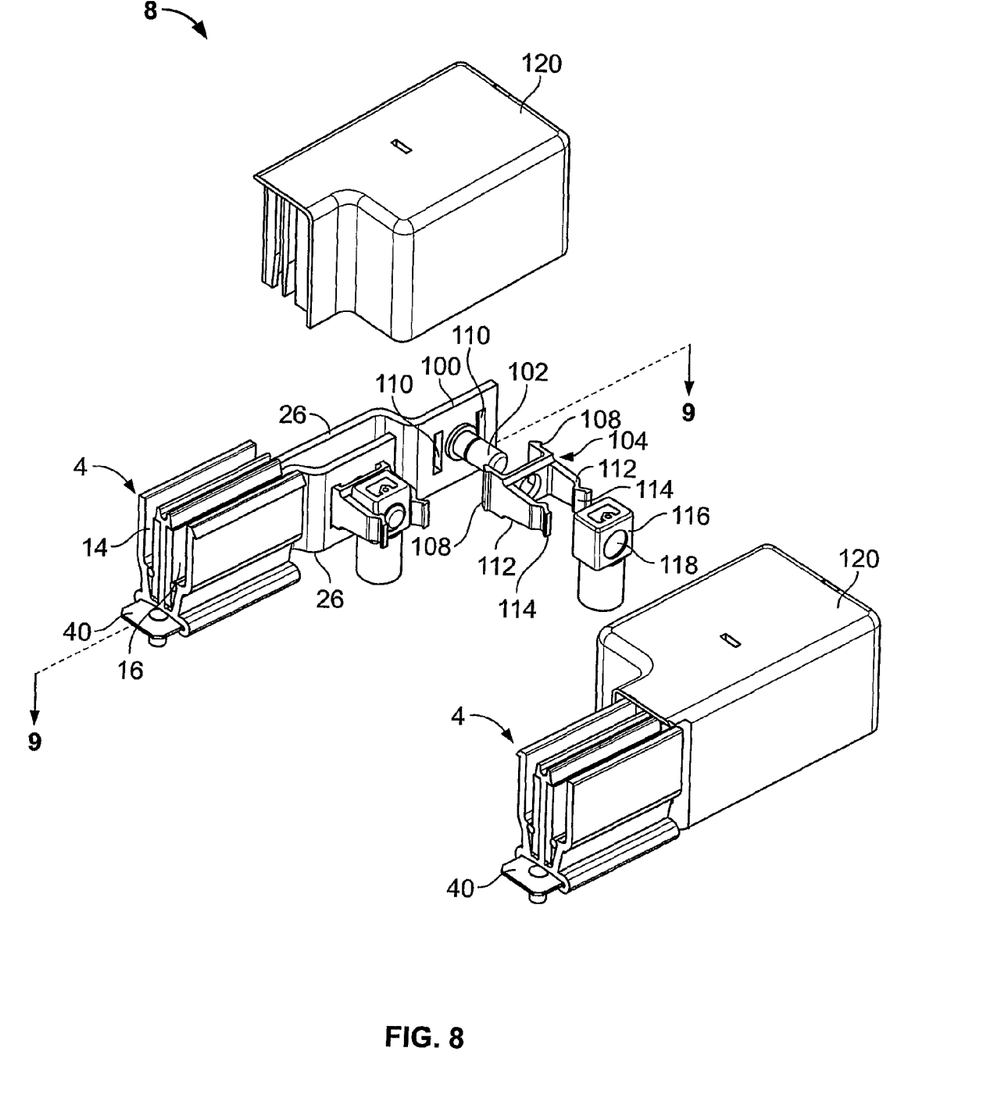
FIG. 8 is an exploded oblique view of the terminator including a shroud at one end of the bus-bar of FIG. 1 and a shroud having a mirror image configuration.
Figure 9:
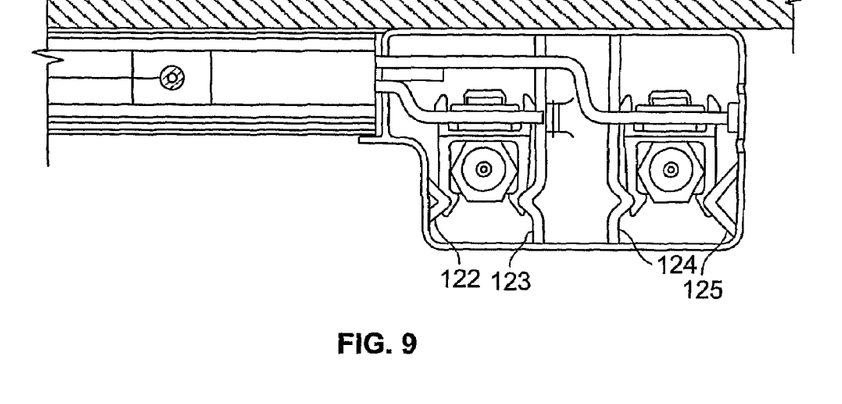
FIG. 9 is a cross-sectional view taken along cutting line 9-9 of FIG. 8 of the terminator of FIG. 8.

The terminator 8 for the bus-bar 2 will now be described with reference to FIGS. 8 and 9. Each conductor 26 has a terminal 100 that extends from the end of the housing 4 and has a post 102 projecting therefrom.

A resilient clip 104 is provided with a hole which receives the post 102 and a pair of first resilient arms 108 that resiliently snap engage a pair of slots 110 in the terminal 100. The resilient clip 104 also has a pair of second resilient arms 112 with jaws 114 at their distal ends which resiliently engage a wire termination 116 when an aperture 118 in the wire termination 116 is slid over the post 102. With such an arrangement the resilient clip 104 will hold the wire termination 116 firmly in engagement with the post 102 and reduce the chance of it becoming accidentally dislodged therefrom. As a further safeguard against the wire termination 116 becoming accidentally detached from the post 102 and to prevent accidental shorting of the terminals 100, the terminator 8 also includes a shroud 120 which covers the terminal 100. The shroud 120 includes first, second, third, and fourth internal blocking members 122, 123, 124 and 125, respectively, arranged so that when the shroud 120 is slid over the terminal portions 100, a pair of blocking members bear inwardly against outer surfaces of each pair of second resilient arms 112 so as to hold them firmly engaged with the associated wire termination 116. In the embodiment shown in FIG. 9, each blocking members 122 and 125 comprise a rib and blocking member 123 and 124 comprise a ribbed wall. The first and fourth blocking member 122, 125 and the surfaces of the pair of second resilient arms 112 that they engage are V-shaped which provides a secure engagement. This provides an even more secure connection to the conductor 26 of the bus-bar 2 and avoids accidental contact with the conductor portion extending from the housing 4. The shroud 120 extends around the post 102 and the resilient clip 104 and constrains the clip 104 to prevent the clip 104 from flexing in a wire termination releasing direction.

While the bus-bar 2 and associated terminator 8 described above includes two conductors 26 which have posts 102 both projecting in the same direction, other numbers of conductors 26 (one or more than two) and relative orientations of terminal posts 102 are possible.

One of the connectors 6 for engagement with the bus-bar 2 will now be described with particular reference to FIGS. 4 to 7.

Figure 5:
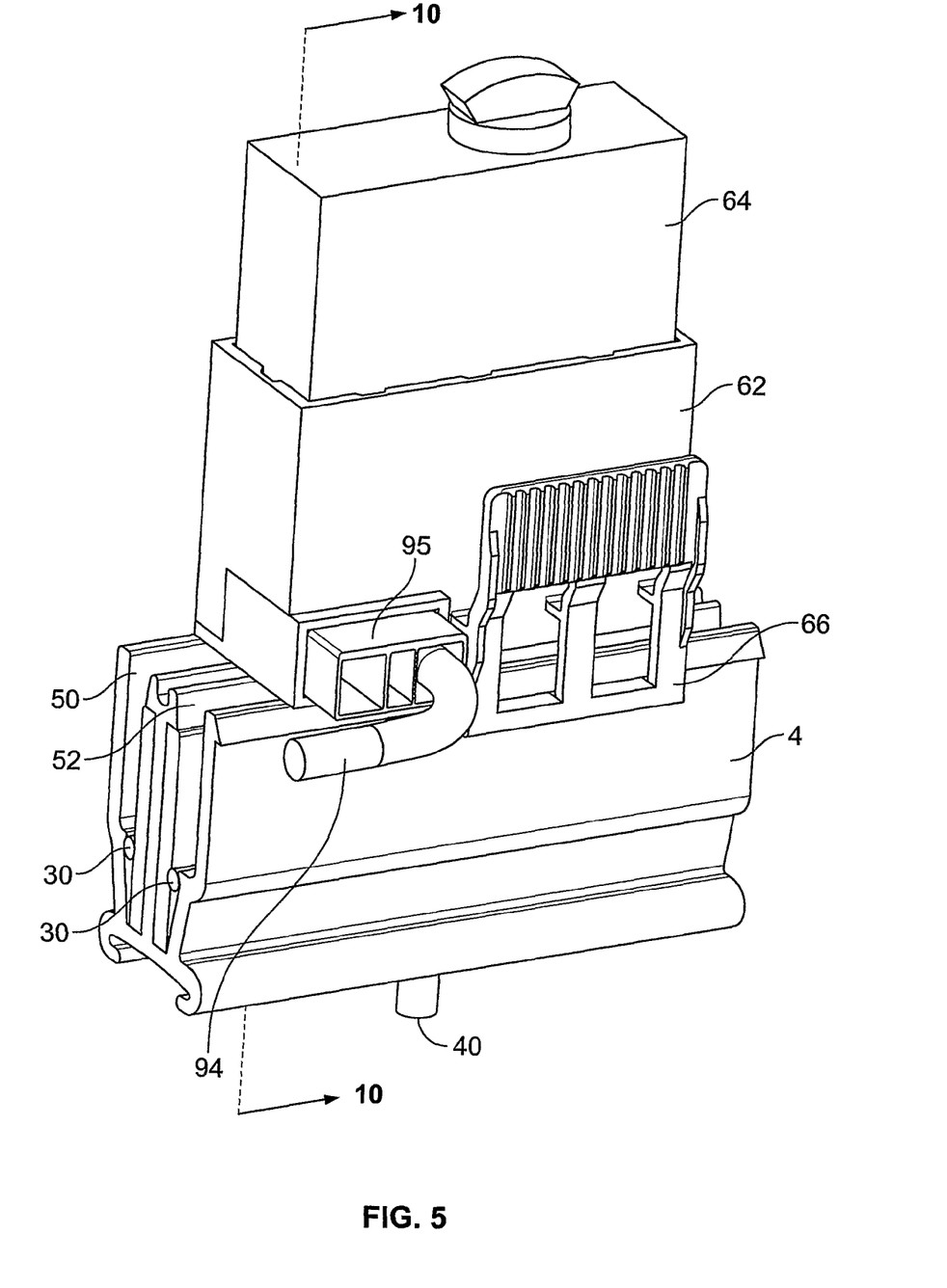
FIG. 5 is an oblique view of a portion of the bus-bar of FIG. 1 with a connector engaged therewith.
Figure 6:
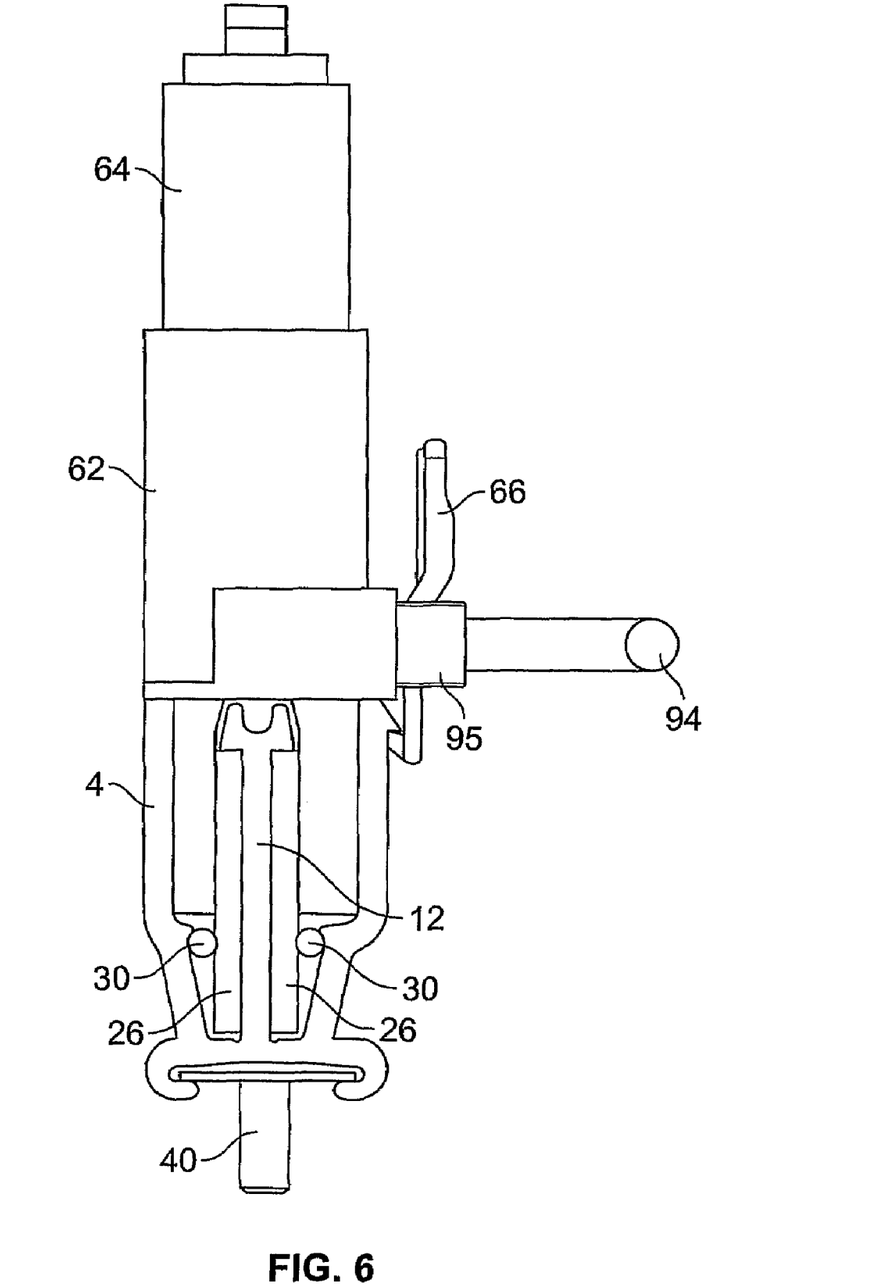
FIG. 6 is a cross-sectional view of the bus-bar portion of FIG. 5.
Figure 7:
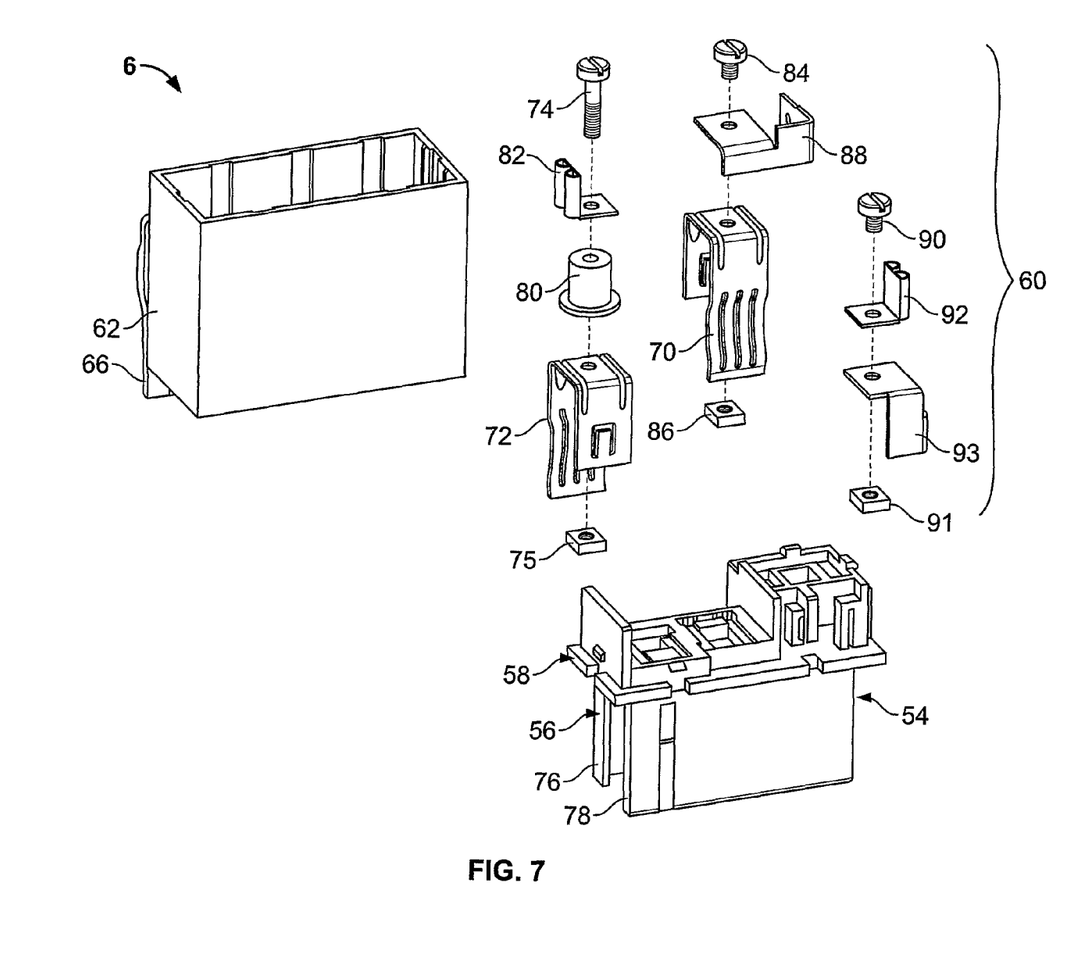
FIG. 7 is an exploded oblique view of the lower and central parts of the connector of FIG. 5.

FIG. 7 shows the major components of the connector 6. A body 54 has a lower portion 56 which is designed for entering the cavities 14, 16 of the bus-bar 2 and an upper portion 58 on which contacting components 60 are mounted. The contacting components 60 are accommodated within a cover 62 with an integral latch 66 on one side thereof for releasably latching the connector 6 to the bus-bar 2 by engagement with a complementary latch shoulder 68 on an outer surface of the housing 4. First and second connector terminals 70 and 72 are mounted in the connector 6 so as to respectively extend down inner faces of a thick leg 76 and a thin leg 78 of the lower connector portion 56 so that when these legs 76, 78 are respectively inserted into the wide cavity 16 and the narrow cavity 14 of the housing 4, the connector terminal terminals 70, 72 electrically engage the conductors 26 in these cavities 14, 16. A first screw 74 and first nut 75 hold the second connector terminal 72, a spacer 80, and a first breaker terminal 82 in place on the main body 54. A second screw 84 and second nut 86 hold the first connector terminal 70 and a first wire connection tab 88 in place on the main body 54. A third screw 90 and third nut 91 hold a second breaker terminal 92 and a second wire connection tab 93 in place on the main body 54. A circuit breaker 64 is mounted in the cover 62 and electrically engages and provides a breaker circuit between the first and second breaker terminals 82 and 92. Wires to be connected to the connector 6 enter it in the form of a cable 94 terminated with a cable plug 95 as shown in FIGS. 5 and 6. A circuit connected to the bus-bar 2 conductors 26 accordingly passes through the circuit breaker 64.

It should be noted that the thick leg 76 of the connector 6 can not enter the narrow cavity 14 which provides polarization which only allows the connector 6 to be engaged with the bus-bar 2 in one orientation. Entrances to the narrow and wide cavities 14, 16 comprise a small entrance 50 and a large entrance 52, respectively, where the large entrance 52 is wider than the small entrance 50. Accordingly, the housing 4 is polarized to facilitate the connection of a connector 6 to the bus-bar 2 in a particular orientation so as to prevent inadvertent misconnection of a connector 6.

Furthermore, since the first and second terminals 70, 72 press inwardly towards each other and engage opposite and outwardly facing outer surfaces 32 of the conductors 26, the conductors 26 support each other and flexing of the housing 4 will not result in any diminution of the contact force between each first and second connector terminal 70, 72 and its associated bus-bar 2 conductor 26.

The connector lower portion 56 also includes a projection 126 which engages the stabilization groove 22 at the end of the inner partition 12 which provides advantageous lateral support for the inner partition 12, and hence, the conductors 26 mounted thereagainst.

Figure 10:
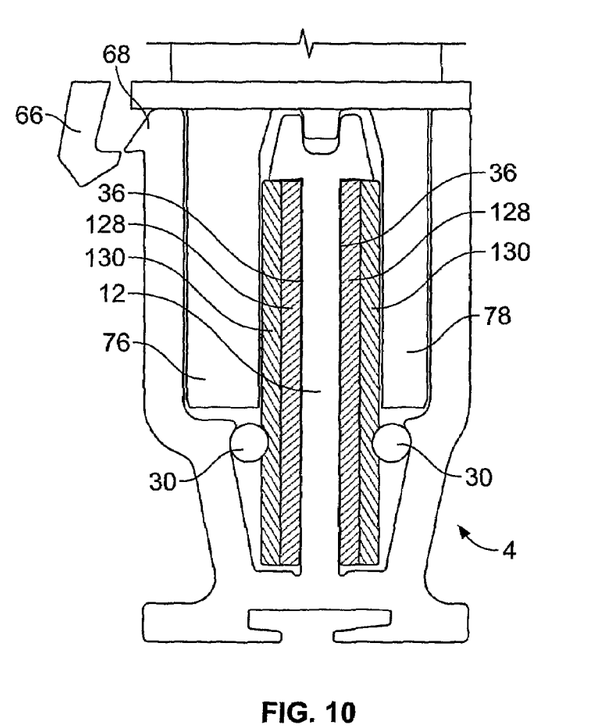
FIG. 10 is a cross-sectional view of an alternate embodiment of a bus-bar according to the present invention in which thinner conductors are held in place with the assistance of spacer members.

So as to make the bus-bar 2 suitable for supplying a variety of different current ranges, it can be supplied with conductors 130 having a smaller cross-sectional area and thickness as shown in FIG. 10. So that retainers 30 of the same size can be employed to retain the conductors 130 in the housing, the bus-bar 2 is provided with a spacer member 128 positioned between each conductor 130 and the associated outer wall 36 of the inner partition 12. The conductor 130 will accordingly be packed out by the spacer member 128 and accordingly, the conductor 130 will be held firmly in place by the retainer 30.

According to the embodiments described above a bus-bar 2 which is easy to assemble and also easy to disassemble for the purpose of recycling is provided.

What is claimed is:

1. A bus-bar, comprising:
    a prismatic housing having a cavity comprising an inner wall and an opposing outer wall;
    an elongate conductor extending along a length of the housing; and
    a resilient retainer which extends along a length of the housing and retains the conductor in the housing
    wherein the conductor is urged toward the outer wall by the retainer that is compressed between the conductor and the inner wall.

2. The bus-bar according to claim 1, wherein the retainer is cord-like.

3. The bus-bar according to claim 1, the retainer comprising:
    an elastomeric material.

4. The bus-bar according to claim 1, the housing comprising:
    a shoulder for retaining the retainer.

5. The bus-bar according to claim 1, further comprising:
    a plurality of conductors, each being retained in the housing by the retainer.

6. A bus-bar, comprising:
a resilient retainer which extends along a length of the housing and retains the conductor in the housing; and
a terminator comprising a terminal of one conductor that extends beyond the housing, a post extending from the terminal for engagement with a wire termination and a resilient clip that is resiliently engageable with the terminal and the wire termination.

7. The bus-bar according to claim 6, wherein each conductor is urged toward the partition by different parts of the retainer.

8. The bus bar according to claim 7, further comprising:
a connector having a first connector terminal and a second connector terminal;
wherein the first connector terminal and the second connector terminal are disposed on opposite sides of the partition and resiliently engage adjacent outer surfaces of the conductors, whereby the conductors are mutually supporting and diminution of a contact force between the first connector terminal and the second connector terminal and the conductors due to flexing of the housing is alleviated.

9. The bus-bar according to claim 1, wherein an elongate spacer member extends along the housing to assist in retaining the conductors.

10. The bus-bar according to claims 1, further comprising a connector;
wherein polarized connection of the connector with the bus-bar is governed by differently sized legs of the connector that can only be inserted into corresponding differently sized cavities
a prismatic housing;
an elongate conductor extending along a length of the housing;
a resilient retainer which extends along a length of the housing and retains the conductor in the housing; and
a partition having cavities on opposing sides thereof a conductor being retained in each cavity by part of the retainer.

11. A bus-bar, comprising:
a prismatic housing;
an elongate conductor extending along a length of the housing; and
a resilient retainer which extends along a length of the housing and retains the conductor in the housing;
wherein the housing is polarized to facilitate the connection of a connector to the bus-bar in a particular orientation.

12. The bus-bar according to claim 11, wherein the polarization is constituted by one cavity having a relatively larger entrance that is wider than a relatively smaller entrance of the other cavity.

13. A bus-bar, comprising:
a prismatic housing;
an elongate conductor extending along a length of the housing;
of the housing in one orientation.

14. The bus-bar according to claim 13, the terminator comprising:
a shroud that extends around the post and the resilient clip and constrains the clip to prevent the clip from flexing in a wire termination releasing direction.

15. The bus-bar according to claim 14, wherein the resilient clip comprises opposed second resilient arms for engaging the wire termination and wherein the shroud comprises blocking members that engage the second resilient arms to constrain the second resilient arms.

16. A bus-bar, comprising:
a prismatic housing;
an elongate conductor extending along a length of the housing;
a resilient retainer which extends along a length of the housing and retains the conductor in the housing; and
a connector;
wherein a partition of the housing engages the connector to laterally restrain the partition.

* * * * *

UNITED STATES PATENT AND TRADEMARK OFFICE
CERTIFICATE OF CORRECTION

PATENT NO. : 7,656,648 B2
APPLICATION NO. : 12/065064
DATED : February 2, 2010
INVENTOR(S) : Malcolm Cant et al.

It is certified that error appears in the above-identified patent and that said Letters Patent is hereby corrected as shown below:

Column 5,
Line 2-8, "a resilent retainer which extends along a length of the housing and retains the conductor in the housing; and a terminator comprising a terminal of one conductor that extends beyond the housing, a post extending from the terminal for engagement with a wire termination and a resilient clip that is resiliently engageable with the terminal and the wire termination." should be -- a prismatic housing; an elongate conductor extending along a length of the housing; a resilient retainer which extends along a length of the housing and retains the conductor in the housing; and a partition having cavities on opposing sides thereof a conductor being retained in each cavity by part of the retainer. --.
Line 31, "sized cavities" should be -- sized cavities of the housing in one orientation. --.
Line 32-39, "a prismatic housing; an elongate conductor extending along a length of the housing; a resilient retainer which extends along a length of the housing and retains the conductor in the housing; and a partition having cavities on opposing sides thereof a conductor being retained in each cavity by part of the retainer." should be deleted.

Column 6 Claim 13,
Line 18, "of the housing in one orientation." should be -- a resilent retainer which extends along a length of the housing and retains the conductor in the housing; and a terminator comprising a terminal of one conductor that extends beyond the housing, a post extending from the terminal for engagement with a wire termination and a resilient clip that is resiliently engageable with the terminal and the wire termination. --.

Signed and Sealed this

First Day of June, 2010

David J. Kappos
*Director of the United States Patent and Trademark Office*